US008833452B2

(12) United States Patent
Williamson

(10) Patent No.: US 8,833,452 B2
(45) Date of Patent: *Sep. 16, 2014

(54) CHEMICAL DIVERSION TECHNIQUE

(75) Inventor: Don Williamson, Belding, MI (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/148,080

(22) PCT Filed: Dec. 16, 2010

(86) PCT No.: PCT/IB2010/055885
§ 371 (c)(1),
(2), (4) Date: Jul. 16, 2012

(87) PCT Pub. No.: WO2011/077337
PCT Pub. Date: Jun. 30, 2011

(65) Prior Publication Data
US 2012/0273208 A1 Nov. 1, 2012

Related U.S. Application Data

(63) Continuation-in-part of application No. 12/643,219, filed on Dec. 21, 2009.

(51) Int. Cl.
*E21B 33/13* (2006.01)
*E21B 43/22* (2006.01)

(52) U.S. Cl.
USPC ........ 166/300; 166/278; 166/279; 166/280.1; 166/291; 166/293; 166/66.5; 166/72; 166/75.15; 166/90.1

(58) Field of Classification Search
None
See application file for complete search history.

(56) References Cited

U.S. PATENT DOCUMENTS

| 4,026,361 | A | 5/1977 | Knapp et al. |
|---|---|---|---|
| 4,527,628 | A | 7/1985 | Dill et al. |
| 5,658,861 | A | 8/1997 | Nelson et al. |
| 6,994,166 | B2 | 2/2006 | Huang et al. |
| 7,220,709 | B1 | 5/2007 | Qu et al. |
| 7,506,689 | B2 | 3/2009 | Surjaatmadja et al. |
| 7,510,009 | B2 | 3/2009 | Cawiezel et al. |
| 7,527,102 | B2 | 5/2009 | Crews et al. |
| 7,625,846 | B2 | 12/2009 | Cooke, Jr. |
| 2003/0075324 | A1 | 4/2003 | Dusterhoft et al. |
| 2005/0059558 | A1 | 3/2005 | Blauch et al. |
| 2006/0017008 | A1 | 1/2006 | Blatchley et al. |
| 2006/0175059 | A1 | 8/2006 | Sinclair et al. |
| 2007/0151726 | A1 | 7/2007 | Crews et al. |
| 2009/0151938 | A1 | 6/2009 | Conkle et al. |
| 2009/0194288 | A1 | 8/2009 | Walters et al. |

OTHER PUBLICATIONS

Magee, et al., "Method for Effective Fluid Diversion when Performing a Matrix Acid Stimulation in Carbonate Formations," SPE 37736, 1997 Middle East Oil Show, Mar. 15-18, 1997, Bahrain, pp. 481-491, Society of Petroleum Engineers.
International Search Report mailed on Jul. 27, 2011 for International Patent Application No. PCT/IB2010/055885, filed on Dec. 16, 2010, 3 pages total.

*Primary Examiner* — Zakiya W Bates
*Assistant Examiner* — Silvana Runyan
(74) *Attorney, Agent, or Firm* — Jeremy D. Tillman; Rachel E. Greene; Tim Curington

(57) ABSTRACT

A method includes treating a first formation intersecting a wellbore, preparing a diversion fluid including an inactivated viscosifier and an inactivated thinning agent, and positioning an amount of the diversion fluid to isolate the first formation. An activator is then delivered to the diversion fluid, thereby activating the inactivated viscosifier and triggering a thinning agent activation process.

13 Claims, 2 Drawing Sheets

CHEMICAL DIVERSION TECHNIQUE

BACKGROUND

The technical field generally relates to diversion in wellbores. Fluid diversion techniques are known in oilfield and other wellbore applications to allow treatment of multiple zones or selected zones within earth formations around the wellbore. Presently known diversion techniques have a few drawbacks, including operational complexity of mechanical components, the requirement for difficult or cleanup after the diversion event, and/or advance preparation of the diversion material with minimal control over the timing of the diversion event. Certain diversion methods include solid matter in the wellbore, e.g. ball sealers or settled sand, that requires later management and that can cause operational difficulty with production equipment. Therefore, further technological developments are desirable in this area.

SUMMARY

One embodiment is a unique method for fluidly isolating zones in a wellbore. Embodiments of the method include activating and/or deactivating an isolation at a selectable time. Further embodiments, forms, objects, features, advantages, aspects, and benefits shall become apparent from the following description and drawings.

DESCRIPTION OF THE ILLUSTRATIVE EMBODIMENTS

Figure 1:
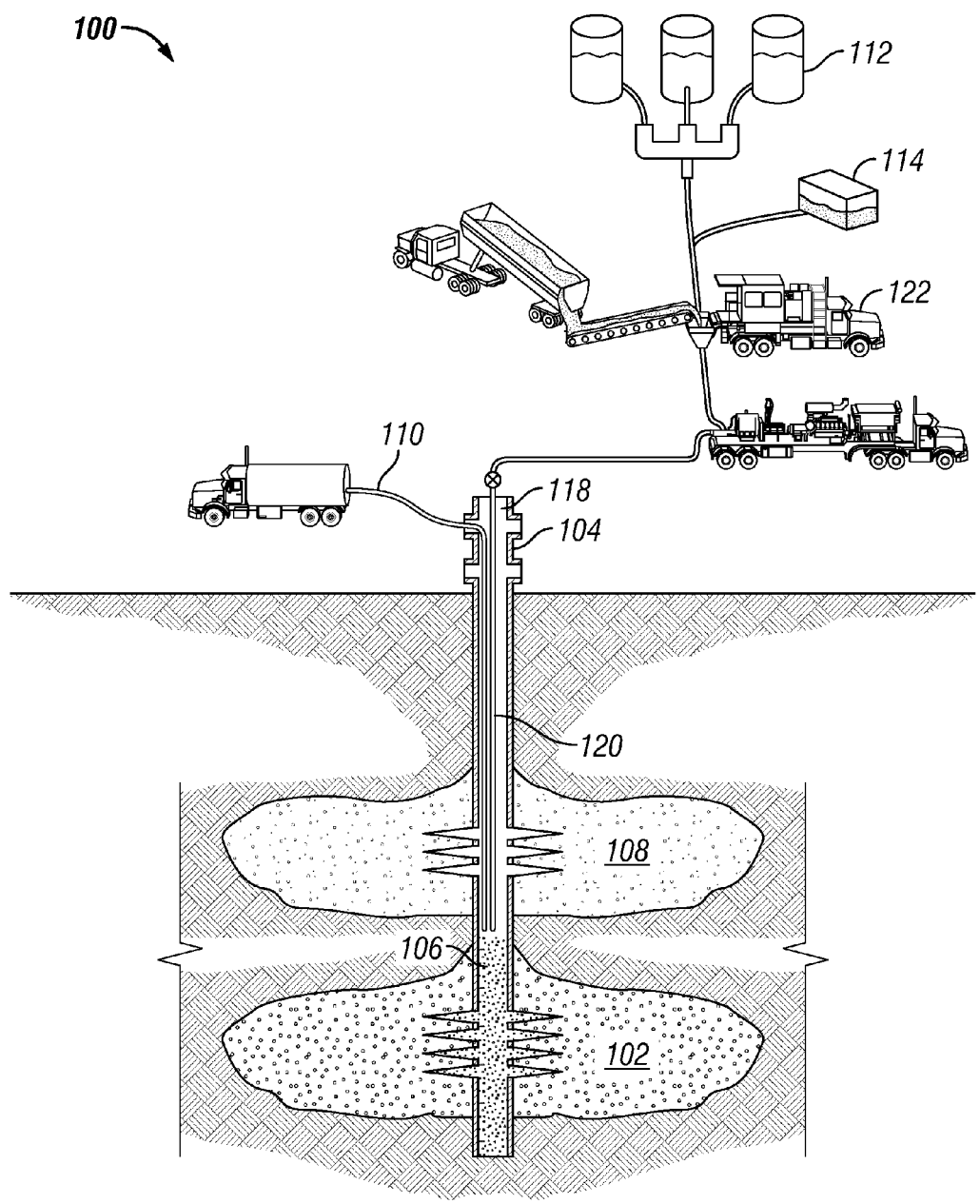
FIG. 1 is a schematic illustration of a system for providing chemical diversion.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

FIG. 1 is a schematic diagram of a system 100 for providing chemical diversion in a wellbore 104. The system 100 includes the wellbore 104 intersecting a first formation 102 at a first position and intersecting a second formation 108 at a second position. The first position is at a greater wellbore measured depth than the second position, but the wellbore may be vertical (as shown), deviated, and/or horizontal. The system 100 further includes an amount of a diversion fluid 106 having an inactivated viscosifier and an inactivated thinning agent. The diversion fluid 106 illustrated in the system 100 is positioned at the first formation 102 such that, when the inactivated viscosifier is activated, diversion is achieved at the first formation 102 and the second formation 108 may be treated. The diversion fluid 106 may be positioned at the first formation 102 during or after a treatment of the first formation, or may be placed in the wellbore 104 to divert from the first formation 102 in a situation where the first formation 102 is not going to be treated or will be treated at a future time after the second formation 108.

The inactivated viscosifier is responsive to a first activator to viscosify the diversion fluid to a diversion viscosity. The diversion viscosity is a viscosity sufficient to divert subsequent treating fluid from the first formation 102 to the second formation 108. The required value of the diversion viscosity depends upon system-specific factors such as the fluid viscosity, treating pressure, difference in vertical depth between the formations 102, 108, and treating pump rate of the subsequent treatment. In certain embodiments, a diversion viscosity of at least 1 Pa·s is sufficient to divert a subsequent fracture treatment.

The inactivated thinning agent is responsive to the first activator or to a second activator to trigger a thinning agent activation process. The system 100 further includes a diverter activation device 110 that delivers the first activator and/or the second activator to the wellbore 104 at the first position. The diverter activation device 110 illustrated in the system 100 is a micro-coil device in a casing-tubing annulus 118. However, the diverter activation device 110 may be a micro-tube, micro-coil, acoustic device, a device capable of delivering an electromagnetic radiation signal, or any other device that can deliver an activator to a downhole wellbore location and activate the inactivated viscosifier. The diverter activation device 110 may include, without limitation, a micro-coil, micro-tube, wireline delivered tool, coiled-tubing delivered tool, and/or a sub on a tubing 120 controlled from surface with a pressure signal or electronic signal to release the first activator at a desired time. In certain embodiments, the diverter activation device 110 includes a device (e.g. the pump) that delivers the activator to the downhole wellbore location as a coated material including the activator that releases the activator according to a time within the wellbore fluid (e.g. to dissolve or react) and/or at a temperature within the wellbore (e.g. to melt or react). The activator may be included in a coated material structured to melt at a specific temperature, for example at the first formation 102 temperature. The thinning agent may be included to activate in response to the same stimulus that activates the viscosifier, but at a later time allowing a treatment on the second formation 108 to be accomplished first.

In certain embodiments, the diversion fluid 106 includes carboxy-methyl-hydroxy-propyl-guar (CMHPG), a non-hydrated polymer, and/or a hydrated non-cross-linked polymer. Examples of an inactivated viscosifier include a cross-linker and/or a hydrater for the diversion fluid. The inactivated viscosifier may be coated and/or encapsulated. The first activator may be an acid, a base, and/or a solvent that releases the viscosifier from the coating or encapsulation.

In certain embodiments, the inactivated thinner includes a material such as a breaker, an oxidizer, an enzyme breaker, and/or an acid. In certain further embodiments, the inactivated thinner includes an amount of particles, each particle having an outer coating. The outer coating of the inactivated thinner may be responsive to the first activator that releases the viscosifier, and/or responsive to a second activator. Where the outer coating is responsive to the first activator, the first activator triggers a thinning agent activation process that culminates in releasing at least a portion of the thinning agent at some time after the diversion fluid has developed diverting viscosity. Where the outer coating is responsive to the second activator, independent activation of the viscosifier and the thinning agent is enabled, and the release of the thinning agent can be delayed until the second activator is applied.

In certain embodiments, the removal of the outer coating from the amount of particles including the thinning agent exposes an inner coating including a semi-permeable membrane that ruptures due to osmotic pressure after a delay period in response to exposure of the inner coating to wellbore fluids. In certain embodiments, the removal of the outer coating from the amount of particles including the thinning agent exposes an inner coating which dissolves or reacts slowly in the diversion fluid 106 at wellbore temperatures to allow the release of the thinning agent at a later time. In certain alternate embodiments, an outer coating of the particles having the thinning agent is thicker than an outer coating of the particles having the viscosifier, and the thinning agent is thereby released at a later time than the viscosifier.

Figure 2A:
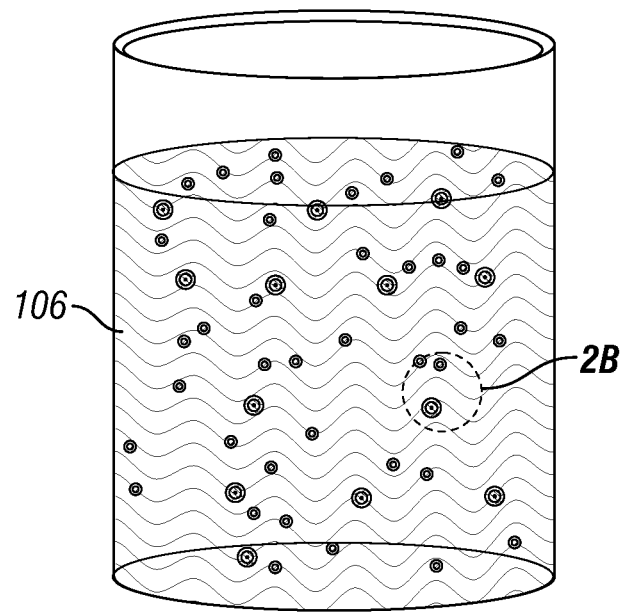
FIGS. 2A and 2B are illustrations of a diversion fluid.
Figure 2B:
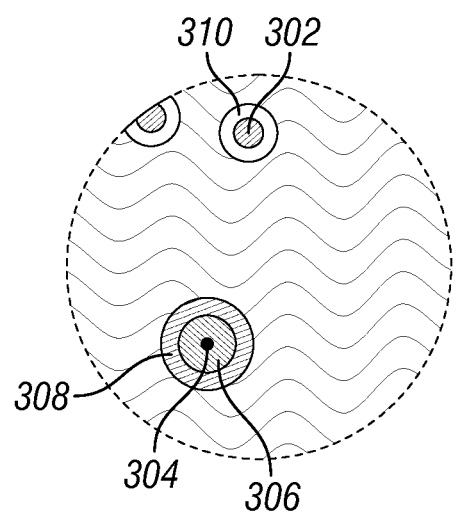

Referencing FIGS. 2A and 2B, an amount of diversion fluid 106 is illustrated having a viscosifier 302 and a thinning agent 304. The viscosifier 302 and thinning agent 304 are inactivated because they have outer coatings 310, 308 which prevent engagement with the substrate fluid of the diversion fluid 106. The coating 310 on the viscosifier 302 is responsive to the first activator, which may be a solvent, acid, base, acoustic pulse, and/or electromagnetic radiation signal including but not limited to light, x-ray, microwave, etc. The coating 308 may be responsive to the first activator or a second activator distinct from the first activator. The thinning agent 304 may further include an inner coating 306 responsive to wellbore fluids and temperature, and/or that may be a semi-permeable membrane that ingests substrate fluid of the diversion fluid 106 until the osmotic pressure bursts the inner coating 306 and releases the thinning agent 304.

The treatment fluid for treating the first formation 102 and/or the second formation 108 may be a treatment fluid 112 also used to form the substrate fluid for the diversion fluid 106. The diversion fluid 106 may be added by providing a fluid 114 at a blender 122 during treatment operations.

An exemplary technique is described for providing chemical diversion of a formation intersecting a wellbore. Operations of the technique represent an exemplary organization of the technique, and operations may be combined, divided, re-ordered, substituted, and/or omitted in certain embodiments. The technique includes an operation to treat a first formation intersecting a wellbore. The treatment may be a fracture treatment, a gravel pack operation, a matrix acidizing operation, a perforation cleanup operation, water control, or any other treatment known in the art. The technique further includes an operation to prepare a diversion fluid having an inactivated viscosifier and an inactivated thinning agent. The viscosifier and thinning agent are inactivated, in that they are not available to viscosify or thin the diversion fluid in the inactivated state. The viscosifier and thinning agent may be inactivated due to a modification of the molecules (e.g. molecules that are a salt or pre-cursor of a final viscosifier or thinning agent), encapsulation or coating preventing the molecules from entering solution in the diversion fluid, or through any other inactivation method understood in the art. The technique further includes an operation to position an amount of the diversion fluid to isolate the first formation. The operation to position an amount of the diversion fluid to isolate the first formation includes providing enough diversion fluid to cover fluid entry points—either perforations or an open-hole section—from the wellbore into the formation. The diversion fluid may further be injected into the formation and/or may be present in the wellbore above and/or below the first formation. The activation techniques herein allow the diversion fluid to be placed in a flexible manner and location while providing for diversion at the selected position and time.

The technique further includes an operation to activate the inactivated viscosifier. An exemplary operation to activate the inactivated viscosifier includes an activation process followed by a predetermined wait period—for example where a coating is provided on the viscosifier that degrades at downhole wellbore temperatures or within the wellbore fluids over the predetermined time period. Another exemplary operation to activate the inactivated viscosifier includes an operation to add an activation chemical to the positioned diversion fluid. The operation to add the activation chemical to the positioned diversion fluid may be performed through a micro-coil or micro-tube, or by adding the activation chemical to the positioned diversion fluid through an annulus. Other exemplary operations to activate the inactivated viscosifier include providing an electromagnetic radiation signal to the positioned diversion fluid—for example where particles are responsive to open, degrade, or collapse in response to a strong electromagnetic signal such as can be applied by an NMR (nuclear-magnetic resonance) tool, and or/an providing an acoustic pulse at a predetermined frequency to the positioned diversion fluid. The acoustic pulse may be provided, for example, at a resonance frequency for a particle coating material to cause the particles to rupture or degrade.

The activated viscosifier is a material that viscosifies the diversion fluid sufficiently to provide fluid diversion. The viscosity required depends upon the purpose of the diversion. For diversion allowing a fracturing treatment in a second formation at a smaller wellbore measured depth than the first formation, a viscosity of 1 Pa·s in the diversion fluid is generally sufficient. It is a mechanical step for one of skill in the art to determine a required viscosity for the diversion purposes in a given embodiment of the technique and to perform standard rheological tests with the planned diversion fluid and viscosifier to confirm sufficient viscosity. In certain embodiments, the viscosifier is a hydration and/or cross-linking agent for the diversion fluid. The diversion fluid can be any polymer known in the art, where the polymer is in an unhydrated and/or un-cross-linked (linear) state, where the viscosifier provides flash hydration and/or cross-linking of the polymer. Certain polymers are known to flash hydrate in a reduced pH environment, and an exemplary viscosifier includes an acid to rapidly reduce pH in the positioned diversion fluid.

The exemplary technique further includes an operation to treat a second formation of the wellbore after the activation of the viscosifier, an operation to activate the inactivated thinning agent, and an operation to flow fluid back from the first and second formations.

An operation to activate the thinning agent includes adding an activation chemical to the positioned diversion fluid and triggering a thinning agent activation process with the activation chemical. The triggering of the thinning agent activation process may occur with the same activation chemical that activates the viscosifier, or with a separate chemical or operation. In certain embodiments, the viscosifier is activated with a first method (e.g. chemical, electro-magnetic, and/or acoustic) and the thinning agent activation process is triggered with a different method (e.g. chemical, electro-magnetic, acoustic, and/or a different chemical than used to activate the viscosifier) such that the triggering of the thinning agent activation process and the activation of the viscosifier may be controlled independently.

In certain embodiments, the operation to trigger the thinning agent activation process includes removing an outer coating from an amount of particles having the thinning agent at a first time, and bursting an inner coating of the amount of particles due to osmotic pressure at a second time. The bursting of the inner coating of the particles having the thinning agent can be controlled by providing the particles with an inner coating that is a semi-permeable membrane and providing the composition of the particles such that, in wellbore fluids, an osmotic pressure of the particles is greater than a rupture strength of the inner coating. The second time is at least a delay period later than the first time. The delay period may be any amount of time understood in the art and useful to the contemplated process. An exemplary delay period includes at least 6 to 24 hours, although shorter and longer delay periods are contemplated herein.

In certain further embodiments, the thinning agent activation process includes degrading a coating from an amount of particles having the thinning agent, where the degrading takes place over a period of time at least equal to a delay period. In certain embodiments, the thinning agent containing particles may degrade according to the same mechanism as the viscosifier-containing particles, but the thinning agent particles may be provided with a thicker coating and/or a coating having a lower surface area to volume ratio such that the mechanism to degrade the thinning agent containing particles takes a longer period of time than the mechanism to degrade the viscosifier containing particles.

In certain embodiments, the technique includes an operation to provide the diversion fluid in a flush fluid utilized in the treating of the first formation. For example, an exemplary treatment is for a fracture treatment including an initial pad stage with zero proppant included, and a final wellbore displacement or flush stage also with zero proppant. The diversion fluid included in the flush stage displaces the diversion fluid to isolate the first formation. Placement to isolate the first formation includes placement that isolates the first formation from the wellbore above the first formation in any manner. For example, placement to isolate the first formation includes placement within the wellbore that covers the perforations. In another example, placement to isolate the first formation includes placement above the first formation and below the second formation.

In certain further embodiments, the diversion fluid is included in at least a portion of a set of treatment stages for the first formation. The diversion fluid may be included in the flush fluid, any proppant stages, any gravel stages, and/or any stages of the set of treatment stages having a screenout risk. The set of treatment stages having a screenout risk depends upon the circumstances of the wellbore and the formations utilized, as well as the nature of the treatment fluid. For example, where experience in a formation and field indicate that 6 PPA (pounds proppant added) can be readily achieved but that higher proppant concentrations may risk screenout, the diversion fluid may be included at treatment stages where proppant concentration exceeds 6 PPA. In another example, a treatment may be designed to intentionally induce a screenout, and the stages where the induced screenout is expected to occur may include the diversion fluid. The examples provided are for illustrative purposes and not limiting. In certain embodiments, the method includes determining that a screenout is imminent, and adding the diversion fluid to the treatment fluid for the first formation in response to determining that a screenout is imminent. For example, a pressure analysis during the treatment may indicate that a tip screenout is occurring (e.g. due to slope observations on a log-log pressure-time plot) and the diversion fluid is included in the treatment fluid in response to the screenout occurrence. The addition of diversion fluid during a screenout, in response to a screenout, and/or within stages at risk for a screenout allows the diversion fluid to be positioned at the end of the treatment and a successful diversion to be implemented once the treatment is completed.

Another exemplary technique is described for providing chemical diversion of a formation intersecting a wellbore. Operations of the technique represent an exemplary organization of the technique, and operations may be combined, divided, re-ordered, substituted, and/or omitted in certain embodiments. The technique includes an operation to treat a first formation intersecting a wellbore, an operation to prepare a diversion fluid including an inactivated viscosifier and an inactivated thinning agent, and an operation to position an amount of the diversion fluid to isolate the first formation. The technique further includes an operation to deliver an activator to the diversion fluid positioned to isolate the first formation, and thereby activate the inactivated viscosifier and trigger a thinning agent activation process.

The technique further includes treating a second formation intersecting the wellbore, providing a residence time until the thinning agent activation process completes and the thinning agent breaks (or just thins sufficiently to flow) the viscosified diversion fluid. The thinning agent activation process is complete when at least a portion of the thinning agent is exposed to the diversion fluid and begins to act on the diversion fluid. The technique includes an operation to flow fluid back from the first formation and the second formation.

Exemplary operations to deliver the activator to the diversion fluid include adding an activation chemical to the positioned diversion fluid through a micro-coil or a micro-tube, adding an activation chemical to the positioned diversion fluid through an annulus, providing an electromagnetic radiation signal to the positioned diversion fluid, and/or providing an acoustic pulse at a predetermined frequency to the positioned diversion fluid. An exemplary thinning agent activation process includes removing an outer coating from an amount of particles having the thinning agent at a first time, and bursting an inner coating of the amount of particles due to osmotic pressure at a second time. The second time is at least a delay period later than the first time, and the second time may be a range of time values over which the particles burst and release the thinning agent.

As is evident from the figures and text presented above, a variety of embodiments are contemplated.

One exemplary embodiment is a method including treating a first formation intersecting a wellbore, preparing a diversion fluid having an inactivated viscosifier and an inactivated thinning agent, and positioning an amount of the diversion fluid to isolate the first formation. The method further includes activating the inactivated viscosifier. Certain embodiments of the method further include treating a second formation intersecting the wellbore, activating the inactivated thinning agent, and flowing fluid back from the first and second formations.

Activating the inactivated viscosifier may include providing a wait-time in the wellbore for at least a predetermined time period. In certain embodiments, activating the inactive viscosifier includes adding an activation chemical to the positioned diversion fluid through a micro-coil or micro-tube, adding an activation chemical to the positioned diversion fluid through an annulus, providing an electromagnetic radiation signal to the positioned diversion fluid, and/or providing an acoustic pulse at a predetermined frequency to the positioned diversion fluid.

Certain embodiments further include activating the inactivated thinning agent. The operation to activate the inactivated viscosifier may further include adding an activation chemical to the positioned diversion fluid and triggering a thinning agent activation process with the activation chemical. In certain embodiments, the thinning agent activation process includes removing an outer coating from an amount of particles comprising the thinning agent at a first time, bursting an inner coating of the amount of particles due to osmotic pressure at a second time, where the second time is at least a delay period later than the first time. The delay period may be any amount of time understood in the art and useful to the contemplated process. An exemplary delay period includes at least 6 to 24 hours. In certain further embodiments, the thinning agent activation process includes degrading a coating from an amount of particles having the thinning agent, where the degrading takes place over a period of time at least equal to a delay period.

In certain embodiments, the diversion fluid is included in a flush fluid utilized in the treating of the first formation. In certain further embodiments, the diversion fluid is included in at least a portion of a set of treatment stages for the first formation. The diversion fluid may be included in the flush fluid, any proppant stages, and/or any stages of the set of treatment stages having a screenout risk. In certain embodiments, the method includes determining that a screenout is imminent, and adding the diversion fluid to the treatment fluid for the first formation in response to determining that a screenout is imminent.

Another exemplary embodiment is a system including a wellbore intersecting a first formation at a first position and intersecting a second formation at a second position, where the first position is at a greater wellbore measured depth than the second position. The system further includes an amount of a diversion fluid having an inactivated viscosifier and an inactivated thinning agent, where the inactivated viscosifier is responsive to a first activator to viscosify the diversion fluid to a viscosity of at least 1 Pa·s. The inactivated thinning agent is responsive to the first activator or a second activator to trigger a thinning agent activation process. The system further includes a diverter activation device that delivers the first activator and/or the second activator to the wellbore at the first position.

In certain embodiments, the diversion fluid includes carboxy-methyl-hydroxy-propyl-guar (CMHPG), a non-hydrated polymer, and/or a hydrated non-cross-linked polymer, and the inactivated viscosifier includes a cross-linker and/or a hydrater for the diversion fluid. In further embodiments, the inactivated viscosifier includes a coated cross-linker and/or an encapsulated cross-linker, and the first activator comprises a material selected from the materials consisting of an acid, a base, and a solvent that releases the viscosifier from the coating or encapsulation. In certain embodiments, the diverter activation device includes a micro-coil, a micro-tube, a coiled tubing, an annulus, an electromagnetic tool on a wireline, an acoustic tool on a wireline electromagnetic tool, an electromagnetic tool on a coiled tubing, and/or an acoustic tool on a coiled tubing.

In certain embodiments, the inactivated thinner includes a material such as a breaker, an oxidizer, an enzyme breaker, and/or an acid. In certain further embodiments, the inactivated thinner includes an amount of particles, each particle having an outer coating responsive to the first activator and/or the second activator, each particle further having an inner coating including a semi-permeable membrane that ruptures due to osmotic pressure after a delay period in response to exposure of the inner coating to wellbore fluids. In certain alternate embodiments, the inactivated viscosifier includes particles having a first outer coating responsive to the first activator, and the inactivated thinner includes particles having a second outer coating also responsive to the first activator, where a thickness of the second outer coating is greater than a thickness of the first outer coating.

Yet another exemplary embodiment is a method including treating a first formation intersecting a wellbore, preparing a diversion fluid including an inactivated viscosifier and an inactivated thinning agent, and positioning an amount of the diversion fluid to isolate the first formation. The method further includes delivering an activator to the diversion fluid positioned to isolate the first formation, thereby activating the inactivated viscosifier and triggering a thinning agent activation process. The method further includes treating a second formation intersecting the wellbore, providing a residence time until the thinning agent activation process completes and the thinning agent breaks the viscosified diversion fluid, and flowing fluid back from the first formation and the second formation.

In certain embodiments, the method further includes delivering an activator to the diversion fluid positioned to isolate the first formation by adding an activation chemical to the positioned diversion fluid through a micro-coil or a micro-tube, adding an activation chemical to the positioned diversion fluid through an annulus, providing an electromagnetic radiation signal to the positioned diversion fluid, and/or providing an acoustic pulse at a predetermined frequency to the positioned diversion fluid. The thinning agent activation process includes removing an outer coating from an amount of particles having the thinning agent at a first time, and bursting an inner coating of the amount of particles due to osmotic pressure at a second time. The second time is at least a delay period later than the first time.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
   treating a first formation intersecting a wellbore;
   preparing a diversion fluid comprising an inactivated viscosifier and an inactivated thinning agent;
   positioning an amount of the diversion fluid to isolate the first formation; and
   activating the inactivated viscosifier by providing at least an electromagnetic radiation signal to the positioned diversion fluid,
   wherein the activating the inactivated viscosifier further comprises providing a wait-time in the wellbore.

2. The method of claim 1, further comprising:
   treating a second formation intersecting the wellbore;
   activating the inactivated thinning agent; and
   flowing fluid back from the first formation and the second formation.

3. The method of claim 1, wherein activating the inactivated viscosifier comprises:
   adding an activation chemical to the positioned diversion fluid through one of a micro-coil and a micro-tube; and
   adding an activation chemical to the positioned diversion fluid through an annulus.

4. The method of claim 3, further comprising activating the inactivated thinning agent.

5. The method of claim 1, wherein activating the inactivated viscosifier comprises adding an activation chemical to the positioned diversion fluid, the method further comprising triggering a thinning agent activation process with the activation chemical.

6. The method of claim 5, wherein the thinning agent activation process comprises removing an outer coating from an amount of particles comprising the thinning agent at a first time, and bursting an inner coating of the amount of particles due to osmotic pressure at a second time, wherein the second time is at least a delay period later than the first time.

7. The method of claim 6, wherein the delay period comprises a period between 6 and 24 hours.

8. The method of claim 5, wherein the thinning agent activation process comprises degrading a coating from an amount of particles comprising the thinning agent, wherein the degrading takes place over a period of time at least equal to a delay period.

9. The method of claim 1, wherein the diversion fluid comprises a portion of a flush fluid utilized in the treating the first formation.

10. The method of claim 1, wherein the treating the first formation comprises treating the first formation with a treatment fluid, and wherein the treatment fluid comprises the diversion fluid for at least a portion of a set of treatment stages.

11. The method of claim 10, wherein the at least a portion of the set of treatment stages includes treatment stages comprising one of proppant and gravel.

12. The method of claim 10, further comprising determining a portion of the set of treatment stages having a screenout risk, and wherein the treatment fluid comprises the diversion fluid for the portion of the set of treatment stages having the screenout risk.

13. The method of claim 10, further comprising, during the treating of the first formation with the treatment fluid, determining that a screenout is imminent, and adding the diversion fluid to the treatment fluid in response to the determining that a screenout is imminent.

* * * * *